United States Patent

Nutto et al.

(10) Patent No.: US 6,702,505 B1
(45) Date of Patent: Mar. 9, 2004

(54) HOOK ELEMENT

(76) Inventors: Uwe Nutto, Fehrenbachallee 69, 79106 Freiburg (DE); Melanie John, Fehrenbachallee 69, 79106 Freiburg (DE)

( * ) Notice: Subject to any disclaimer, the term of this patent is extended or adjusted under 35 U.S.C. 154(b) by 0 days.

(21) Appl. No.: 10/070,906
(22) PCT Filed: Sep. 6, 2000
(86) PCT No.: PCT/DE00/03090
§ 371 (c)(1), (2), (4) Date: Mar. 8, 2002
(87) PCT Pub. No.: WO01/17867
PCT Pub. Date: Mar. 15, 2001

(30) Foreign Application Priority Data

Sep. 8, 1999 (DE) .......................... 199 42 755

(51) Int. Cl.[7] ............................. B65D 21/024
(52) U.S. Cl. ................. 403/322.4; 403/245; 24/421; 248/225.21
(58) Field of Search ................. 248/214, 215, 248/220.22, 225.21, 692, 304, 307, 312.1, 313; D8/367; 24/3.2, 421; 224/449, 458, 560, 462, 536; D34/35; 403/322.4, 245

(56) References Cited

U.S. PATENT DOCUMENTS

| | | | | |
|---|---|---|---|---|
| 865,152 A | * | 9/1907 | Arcoren | 248/201 |
| 942,366 A | * | 12/1909 | Deeter | 248/229.26 |
| 1,343,855 A | * | 6/1920 | Tyler | 248/489 |
| 2,533,083 A | * | 12/1950 | Blackburn | 24/512 |
| 2,749,196 A | * | 6/1956 | Wolfe | 248/214 |
| 3,536,287 A | * | 10/1970 | Kramer | 248/301 |
| 4,301,767 A | * | 11/1981 | Willinger et al. | 119/245 |
| 4,893,773 A | * | 1/1990 | Fujimoto | 248/311.2 |
| D322,927 S | * | 1/1992 | Schuster | D8/367 |
| 5,282,599 A | * | 2/1994 | Arpaia et al. | 248/311.2 |
| 5,288,094 A | * | 2/1994 | Putnam | 280/420 |
| D359,675 S | * | 6/1995 | Steinberg et al. | D8/373 |
| 5,579,971 A | * | 12/1996 | Chuang | 224/430 |
| 5,864,928 A | * | 2/1999 | Matsushima | 24/421 |
| 5,873,555 A | * | 2/1999 | Crace | 248/312.1 |
| 5,947,433 A | * | 9/1999 | Klein | 248/214 |
| D459,855 S | * | 7/2002 | Fujikawa et al. | D34/35 |

FOREIGN PATENT DOCUMENTS

| | | | | |
|---|---|---|---|---|
| DE | WO-98/14381 A1 | * | 4/1998 | |
| NL | 101700 | * | 6/1962 | 248/215 |

* cited by examiner

Primary Examiner—Ramon O. Ramirez
Assistant Examiner—Jon Szumny
(74) Attorney, Agent, or Firm—Gudrun E. Huckett

(57) ABSTRACT

A hook element for detachably connecting two objects with one another has a first hook shank, a second hook shank, and a hook bow connecting the first and second hook shanks with one another. The hook bow has a lateral cutout. At least one of the first and second hook shanks has a slanted contact surface. The slanted contact surface extends on the front side of the hook shank from the outer side to the inner side and extends along the forward edge of the hook shank over the entire length of the hook shank. The hook elements can be easily connected to one another even when not aligned but rotated relative to one another.

13 Claims, 3 Drawing Sheets

HOOK ELEMENT

BACKGROUND OF THE INVENTION

1. Field of the Invention

The invention relates to a hook element for detachably connecting two objects with one another, comprising a first hook shank and a second hook shank connected by means of a hook bow, wherein a lateral cutout is provided in the area of the hook bow.

2. Description of the Related Art

Such a hook element is known from PCT/EP97/05363 and is used for suspending bicycle bags from a bicycle baggage rack. By means of the lateral cutout, material is removed from the hook element in the area of the hook bow so that two identical hook elements, which are fastened on two oppositely positioned objects, for example, on the aforementioned bicycle bags, can be pushed into one another. When lifting the bicycle bags the load is then uniformly distributed onto both hook elements.

When connecting two objects with the known hook elements, it is however disadvantageously required that the hook elements are substantially inserted horizontally and with great care. Otherwise, a mutual blocking of the hook elements can result.

SUMMARY OF THE INVENTION

The object of the invention thus resides in that the known hook element is to be developed further such that a connection of two objects by means of two or more hook elements is possible in a simple way.

The object is solved according to the invention with a hook element of the aforementioned kind in that at least one hook shank has a slanted contact surface.

As a result of the slanted contact surface it is no longer required that the hook elements, when connecting two objects, are to be carefully introduced into one another. Instead, the slanted contact surface makes it possible that the hook elements can be inserted into one another in a horizontal direction as well as in a vertical direction at an angle to one another. It is even possible to join two hook elements which are turned relative to one another by 90° and to then connect the two hook elements by a circular pivot movement about 90°. This has in particular the advantage that the hook elements must no longer be connected on the objects always on the same locations with the previously required minimal tolerances. This facilitates the manufacture of the objects provided with the hook elements such as, for example, bicycle bags, because now the introduction of the hook elements into one another is facilitated significantly by the slanted contact surfaces.

It is conceivable that only a part of a forward edge of the hook shank is provided with the slanted contact surface. The greater the surface area of the slanted contact surface, the simpler the joining of the two hook elements. One embodiment of the invention therefore provides that the slanted contact surface extends from the outer side to the inner side of the at least one hook shank. Expediently, the slanted contact surface extends along the forward edge about the entire length of the at least one hook shank.

Joining of two hook elements is furthermore facilitated when also the other hook shank has a slanted contact surface. A further embodiment of the invention therefore suggests that the first hook shank and the second hook shank each have a slanted contact surface.

When joining two hook elements which are rotated relative to one another by 90°, the subsequent pivot movement results in frictional wear on the edges or surfaces contacting one another. A further embodiment of the invention therefore suggests that on a lower edge of the hook bow a rounded portion is provided. With this rounded portion, the circular movement or the pivot movement is additionally made easier. In the case of two joined hook elements, one hook element is thus protected against frictional wear. In order to facilitate the pivot movement also for the second hook element, so that no frictional wear occurs, a further embodiment of the invention suggests that an upper edge of one hook shank has a rounded portion in the area of the hook bow.

When two hook elements are joined, they should have as little lateral play as possible. A further embodiment of the invention therefore suggests that the hook bow has a contact edge which extends from the exterior to the center of the hook bow. When joining the two hook elements, they glide, in particular, upon pivot movement, mutually on the contact edges until, after joining, they rest against one another substantially flush in the area of the hook bows in an end position.

The hook element can be fastened by means of rivets or screws on a container such as, for example, a bicycle bag. However, this fixes the position of the hook element. In order to achieve an adjustability of the position of the hook element, a further embodiment of the invention provides that on one hook shank, in particular, in the area of its outer side, two oppositely positioned grooves for attachment of the hook element on a container are provided. When fastening the hook element, the hook element is slipped with the grooves onto a guide rail which is attached to the container and can then be locked by means of an additional locking bolt which is, for example, arranged on the guide rail. This ensures an adjustability of the position of the hook element depending on the arrangement of the guide rail, for example, in the horizontal direction or vertical direction on the container.

When joining two hook elements, the two hook elements should rest flush against one another and should thus require as little space as possible. In this connection, it is advantageous to provide on a first hook shank a receiving opening for receiving a hook shank of the second hook element. In order to ensure a problem-free joining of two hook elements also in the context of a pivot movement, wherein the hook elements are joined while positioned at an angle of up to 90°, a further embodiment of the invention suggests that the upper side and the underside of the receiving opening in the insertion direction of the hook shank of the second hook element is slanted such that in the insertion direction they converge approximately conically.

The slanted contact surfaces on the two hook shanks are realized such that the slanted contact surface on the first hook shank, on which also the fastening elements for fastening the hook element on the container are attached, extends from the outer side up to the inner side of the first hook shank. In the second hook shank, the slanted contact surface extends from the inner side to the outer side of the second hook shank. However, it is also conceivable that the slanted contact surface on the first hook shank extends from its inner side to its outer side and the slanted contact surface on the second hook shank accordingly extends from its outer side to its inner side. This second variant has the significant advantage relative to the first variant that upon joining of two hook elements the total width of the two joined hook elements is smaller than in the first variant. Therefore, a special embodiment of the invention suggests that on the second hook shank the slanted contact surface extends from the outer side of the hook shank to the inner side. In addition, on the first hook shank the slanted contact surface can extend to the exterior as well as the interior for a simplified joining of the two hook elements so that, according to a further embodiment of the invention, on the first hook shank the slanted contact surface extends, starting on a forward edge of the first hook shank, to the inner side and the outer side of the first hook shank. Expediently, the forward edge of the first hook shank is rounded so that upon a pivot movement an easy joining of the two hook elements is made possible.

The joined hook elements can be detached again by a simple movement counter to the insertion direction. In order to prevent an accidental detachment of the hook elements, it is required that at least one hook element has a locking bolt which prevents detachment. In order to ensure such a safe locking of the two hook elements, a further embodiment of the invention suggests that the first hook shank has a shank portion arranged below and laterally relative to the hook bow in which an opening for receiving a bolt head of a locking bolt is provided. In the locked state, the bolt head engages the opening and prevents thus an accident detachment which is possible only against the resistance of the locking bolt. When the two hook elements are detached, the locking bolt is moved into its release position. In order for the locking bolt to be able to carry out this movement, a further embodiment of the invention suggests that the first hook shank has a cutout for receiving the locking bolt. By the configuration of the cutout which receives most of the locking bolt in the released position, a hook element is provided which has a minimal width because without the cutout significantly more space would be required for receiving the locking bolt.

In order to reduce the total width of two joined hook elements further, another embodiment of the invention provides that the second hook shank on its inner side has an additional slanted portion which is arranged approximately opposite the opening of the first hook shank and extends from the lower area of the inner side to the upper side of the second hook shank. When detaching and joining two hook elements, sufficient space for the movement of the locking bolt of the first hook element into its release position, i.e. the movement in the direction of the second hook shank of the second hook element, is provided by means of this slanted portion. In order for the detachment of two joined hook elements to be possible without greater difficulties but still with a certain resistance, the bolt head of the locking bolt is advantageously slanted in a pyramid shape.

When the hook elements are arranged on, for example, bicycle bags, it is desirable that the connection of two bicycle bags is possible with a simple pivot movement. For this purpose, a further embodiment of the invention suggests that the hook element together with three additional hook elements are arranged on a sidewall of a container wherein two hook elements are positioned adjacent to one another in the same orientation and two hook elements are arranged oppositely to one another and rotated by 180°.

BRIEF DESCRIPTION OF THE DRAWINGS

The invention will be explained in the following with the aid of the drawing. The drawing shows embodiments of the invention. It is shown in.

DESCRIPTION OF THE PREFERRED EMBODIMENTS

Figure 1:
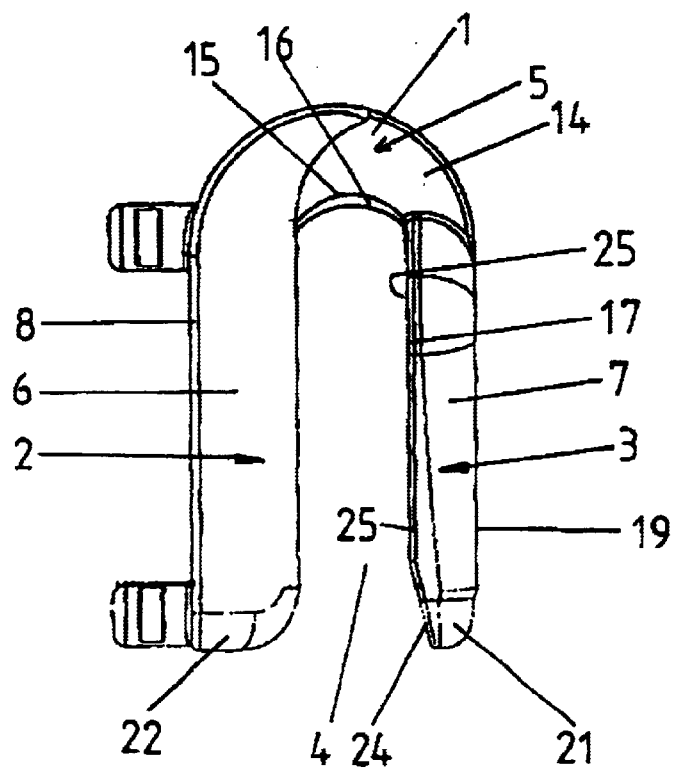
FIG. 1 a front view of a first embodiment of the hook element.

The hook element according to the invention is a unitary part and has a hook bow 1, a first hook shank 2, and a second hook shank 3. Overall, the hook element is U-shaped wherein the first hook shank 2 and the second hook shank 3 extend approximately parallel to one another and a slot 4 is formed between them. In the area of the hook bow 1 a lateral cutout 5 is provided. The first hook shank 2 has a slanted contact surface 6 and the second hook shank 3 also has a slanted contact surface 7. The slanted contact surface 6 extends from the forward edge 8 of the outer side 9 of the first hook shank 2 at a slant to the interior in the direction of the slot 4 to the inner side 10 of the first hook shank 2. Moreover, the slanted contact surface 6 extends from the underside 11 of the first hook shank 2 along the forward edge 8 to the upper side 12 of the hook bow 1. With this slant of a uniform incline, on the upper side 12 of the hook bow 1 a contact edge 13 is formed which extends from the upper side of the forward edge 8, beginning at the outer side 9, toward the inner side up to approximately the center of the circular hook bow 1 which corresponds also to the center of the width of the slot 4. The contact edge 13 and the upper part of the slanted contact surface 6 form a limitation of the cutout 5 in the direction toward the first hook shank 2. In the direction of the hook bow 1 the cutout 5 is limited by an end face 14. The end face 14, which extends vertically, has a curved lower edge 15 which extends arc-shaped from the first hook shank 2 to the second hook shank 3. The lower edge 15 is provided with a rounded portion 16. In the area of the second hook shank 3 the cutout 5 is limited by an upper edge 17 of the second hook shank 3. The upper edge 17 is flattened and extends at a slant forwardly and downwardly. Moreover, the upper edge 17 adjoins the end face or and wall 14 wherein the transition between the upper edge 17 and the end face 14 is rounded (18). The slanted contact surface 7 of the second hook shank 3 also begins at the end face 14, wherein this slanted contact surface 7 extends at a slant from the outer side 19 of the second hook shank 3 upwardly to the upper edge 17. The forwardly extending upper edge 17 has a curved transition at the front side of the second hook shank 3 into a forward edge 20 of the second hook shank 3, wherein the curvature is approximately 90°. The front side of the second hook shank 3, for forming the slanted contact surface 7, can be slanted across areas of different length. In the embodiment illustrated in the drawing, the slanted contact surface 7 extends from the end face 14 to approximately the center of the forward edge 20 of the second hook shank 3. The front edge 20 extends downwardly to the rear so that the lower end 21 of the forward edge 20 is displaced to the rear relative to the lower end 22 of the forward edge 8 of the first hook shank 2. The backside 23 of the second hook shank 3 extends from the hook bow 1 downwardly and forwardly so that the lower end of the backside 23 is also displaced relative to the lower end of the backside of the first hook shank 2. The lower end of the backside 23 is forwardly displaced relative to the other lower end of the backside of the first hook shank 2. A slanted portion 24 extends across the width of the hook shank 3 in the area of the lower end 21 from the inner side 25 of the hook shank 3 to the outer side 19 of the hook shank 3.

Figure 2:
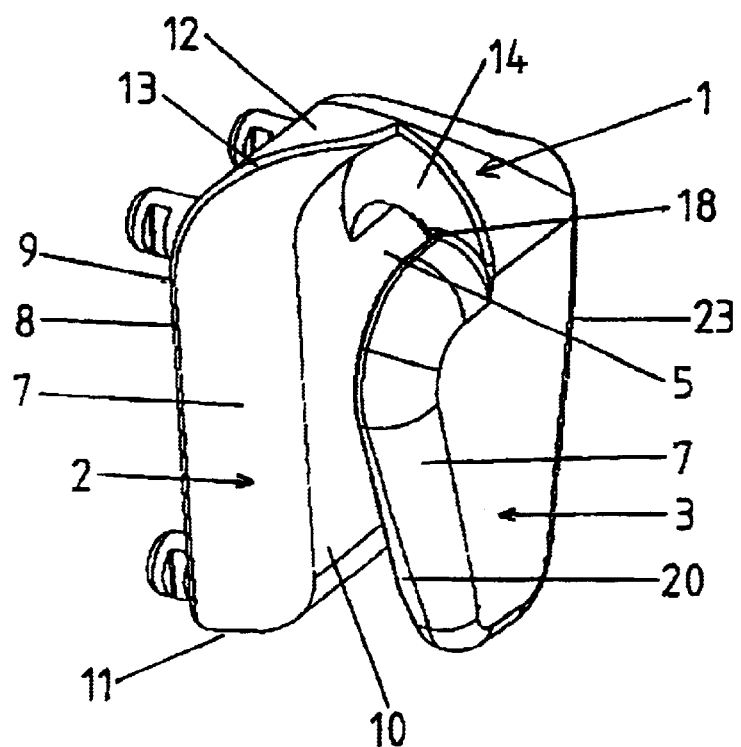
FIG. 2 a perspective view of the hook element according to FIG. 1.

The hook element has openings and bores, which are not illustrated in FIGS. 1 and 2, for attachment on the bicycle bags or for attachment of other parts, such as a locking pawl.

Figure 3:
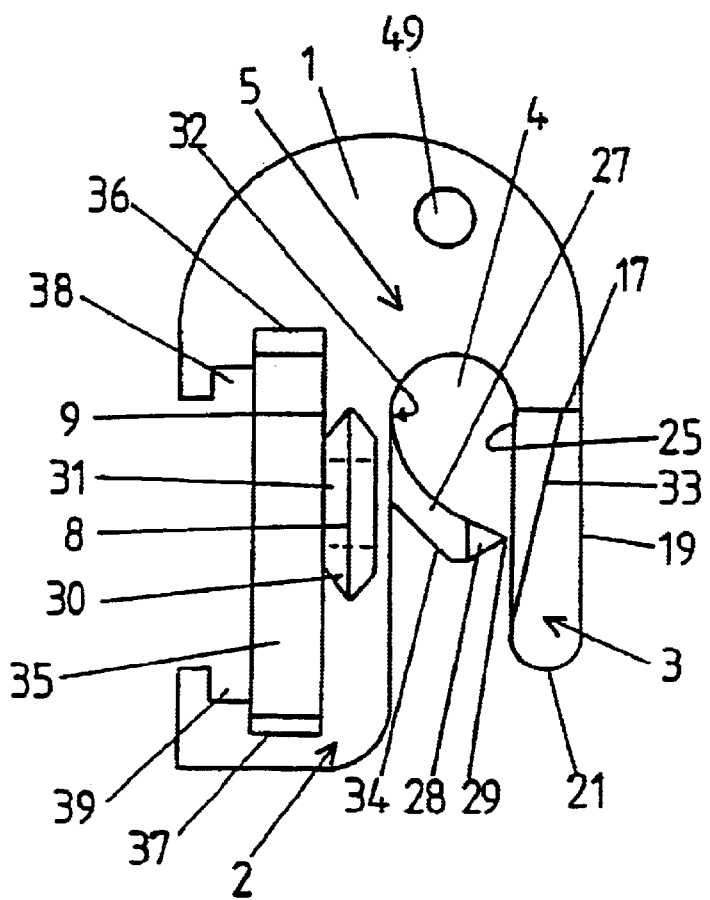
FIG. 3 a further embodiment of the hook element in a front view.

In the embodiment illustrated in FIG. 3 in the hook bow 1 an elongate opening 26 is provided in which a locking bolt 27 is inserted. For a rotational attachment of the locking bolt 27 a horizontal bore 49 is provided in the hook bow 1 in which a pin, not illustrated in the drawing, is inserted which in the mounted state extends through a further bore 49a in the locking bolt 27. The locking bolt 27 is spring-loaded and has a pyramid-shaped bolt head 28. In the rest position or the locking position of the locking bolt 27, the bolt head 28 is within the slot 4 wherein a tip 29 of the bolt head 28 rests against the inner side 25 of the hook shank 3. The lateral cutout 5 in this embodiment is enlarged relative to the embodiment according to FIG. 1 such that it extends in the area of the first hook shank 2 downwardly to the level of the upper edge 17 of the second hook shank 3. The thus configured first hook shank 2 in this way is provided with a shank portion 30 positioned below and laterally relative to the hook bow 1. In this shank portion 30 an opening 31 is provided which, upon joining of two hook elements, receives the bolt head 28 of the second hook element. In order for the joining of two hook elements to be simplified, the slanted contact surface 7, in contrast to the embodiment according to FIG. 1, now extends from the outer side 19 of the hook shank 3 to the inner side 25 of the hook shank 3. The slanted surface of the slanted contact surface 7 therefore in the case of the hook element according to FIG. 3 points inwardly to the slot 4 while in the case of the hook element according to FIG. 1 it faces outwardly away from the slot 4. In the first hook shank 2 the slanted contact surface 6 extends from the forward edge 8 of the hook shank 2 to the inner side 10 as well as to the outer side 9 of the hook shank 2 so that the surfaces of the slanted contact surface 6 points inwardly toward the slot 4 and outwardly away form the slot 4. Moreover, the forward edge 8 of the first hook shank 2 is rounded such that in a side view it is of an approximately semi-circular shape so that the joining of two hook elements, which during joining can be positioned at an angle of up to 90° relative to one another, is facilitated. In the first hook shank 2 the elongate opening 26 for receiving the locking bolt 27 continues in the form of the cutout 32. In this cutout 32 the locking bolt 27 is positioned when, for locking the shank portion 30, a second hook element is inserted into the slot 4. In order for the locking bolt 27 to be able to give way to the insertion movement of the shank portion 30, on the second hook shank 3 at its inner side 25 an additional slanted portion 33 is provided which is positioned approximately opposite the opening 31 of the first hook shank 2. The slanted portion 33 extends across the inner side 25, starting at an area somewhat above the lower end 21 on the inner side, to the upper edge 17 of the second hook shank 3 in the vicinity of the outer side 19 and faces with its surface the slot 4. Upon insertion and detachment of two hook elements, the locking bolt 27 of the one hook element is then positioned partially with its backside 34 on the slanted portion 33 of the second hook element.

Figure 4:
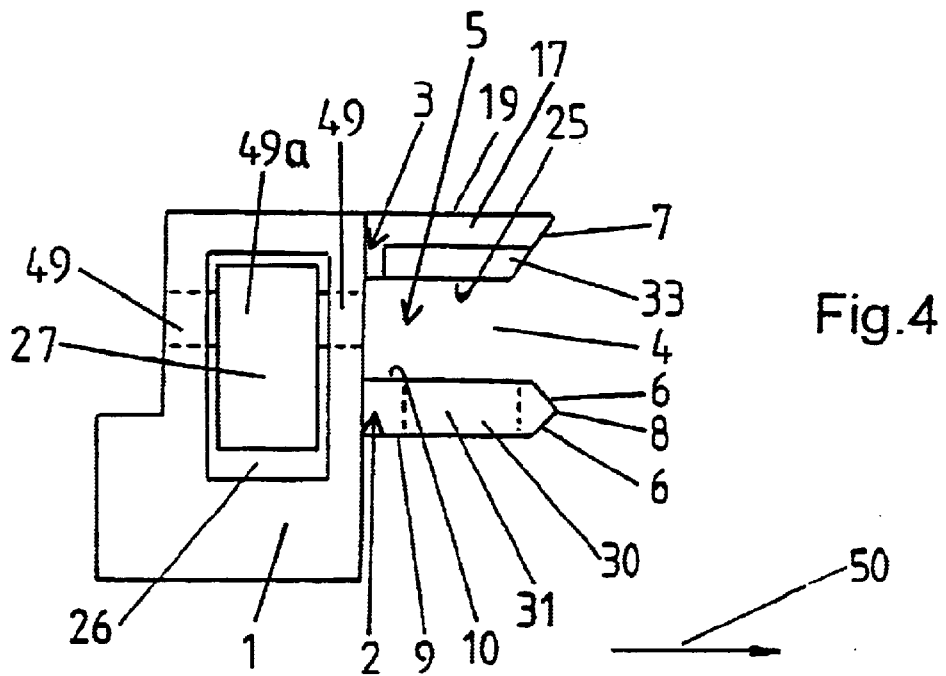
FIG. 4 a plan view according to FIG. 3.
Figure 5:
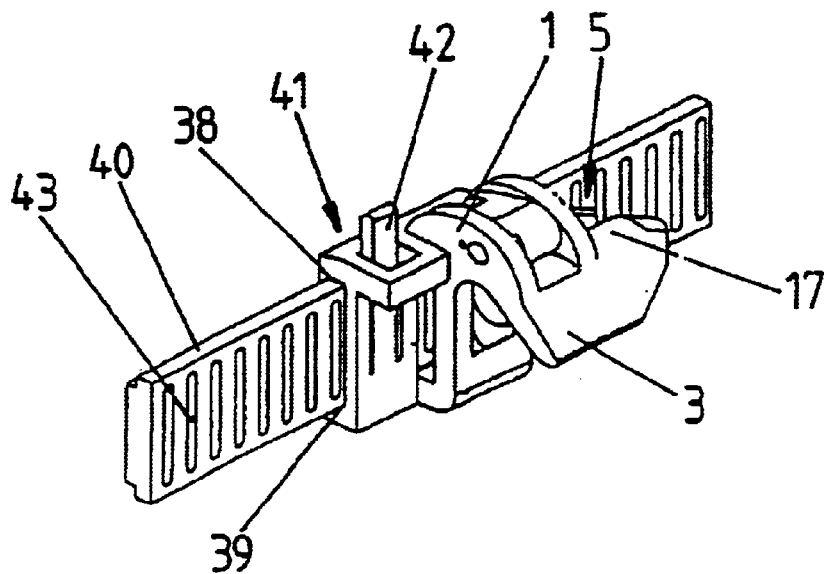
FIG. 5 a hook element according to FIG. 3 with a guide rail.

For joining two identical hook elements in the area of the first hook element 2 a receiving opening 35 is provided into which the hook element 3 of the second hook element is inserted upon joining. The receiving opening 35 is limited in the direction toward the slot by the outer side 9. Moreover, the receiving opening 35 has an upper side 36 and an underside 37 which are slanted such that, viewed in the insertion direction of the second hook element, they converge approximately conically. The insertion direction 50 illustrated in FIG. 4 is the insertion direction of the first hook element and thus counter to the insertion direction of the second hook element. A groove 38 adjoins laterally outwardly the upper side 36 and a further groove 39 adjoins laterally outwardly the underside 37. The grooves 38 and 39 are provided for attachment on a container, as illustrated in FIG. 5. For attachment, the hook element is moved by means of the grooves 38 and 39 onto a stepped rail 40. In the embodiment illustrated in FIG. 5, on the hook element additionally a locking unit 41 with a locking bolt 42 is provided. The locking unit 41 has also the grooves 38 and 39. The locking unit can be embodied as a unitary part together with the hook element. However, it can also be a separate part which is slidably arranged on the rail 40. For locking, the rail 40 has transverse grooves 43. On the locking bolt 42 a projection is provided, not illustrated in the drawing, which upon actuation of the locking bolt 42 engages the transverse grooves 43 for locking. By means of the provided grooves 38 and 39, the hook element can thus the moved on the rail 40 into any desired position and secured therein by the locking unit 41.

Figure 6:
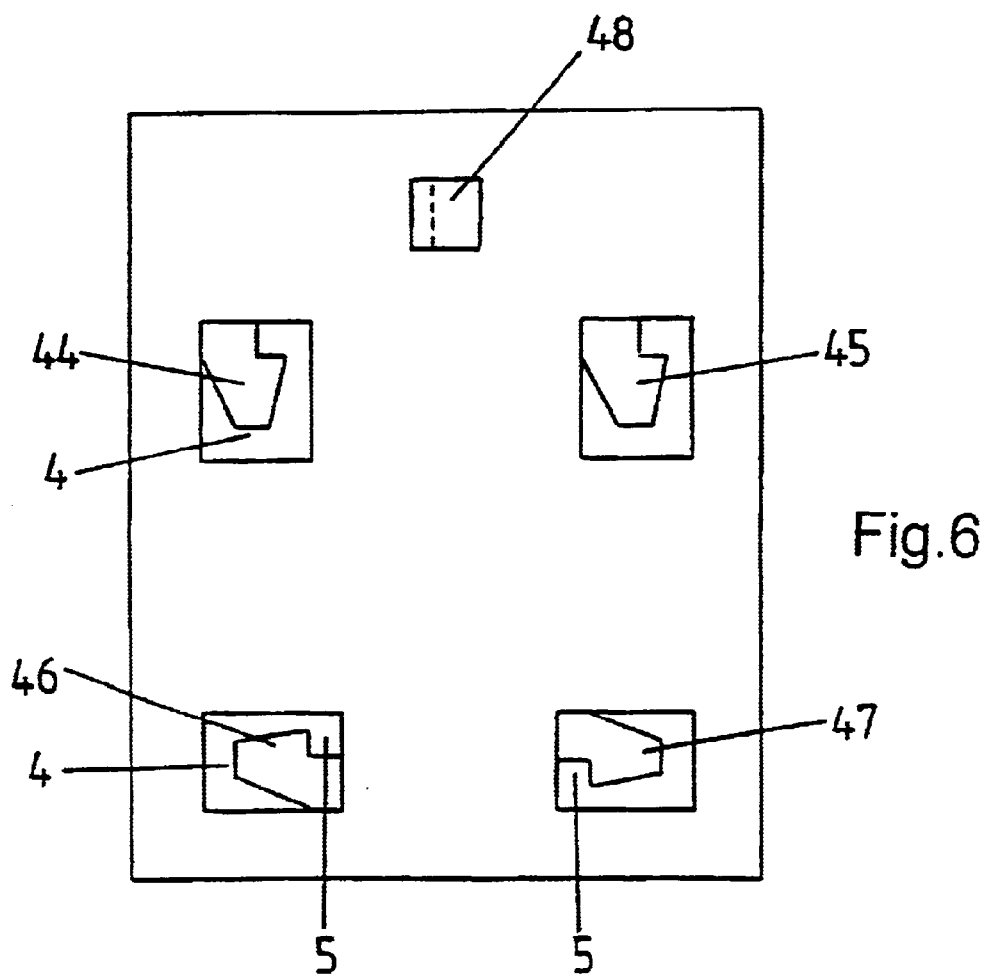
FIG. 6 a schematic illustration of a container with hook elements according to the first embodiment.

FIG. 6 show schematically the arrangement of at least four of the hook elements 44, 45, 46, 47 on the sidewall of a bicycle bag. All four hook elements are embodied according to the embodiment of FIG. 1. The hook elements 44 and 45 are positioned adjacent to one another and at the same level. Below there are two further hook elements 46 and 47. The hook element 47 is positioned horizontally opposite the hook element 46 but is rotated with regard to its orientation relative to the hook element 46 by 180° so that the lateral cutout 5 of the hook element 47 points downwardly while the cutout 5 in the hook element 46 points upwardly to the hook element 44. In comparison to the hook element 44 the hook element 46 is rotated by 90° such that the slot 4 of the hook element 46 is open to the exterior while in the hook element 44 it is open downwardly. In addition, the hook element 46 is mirror-symmetrical relative to the hook element 44. When a second bicycle bag has an identical arrangement of these hook elements, these two bicycle bags can be connected by a simple pivot movement by means of the hook elements. For this purpose, the hook element 47 of the second bicycle bag is placed onto the hook element 46 of the first bicycle bag at an angle of up to 90°, advantageously 45°, and subsequently the pivot movement is carried out such that, as a consequence, the hook element 47 of the first bicycle bag connects to the hook element 46 of the second bicycle bag, the hook element 45 of the first bicycle bag to the hook element 44 of the second bicycle bag, and, finally, the hook element 44 of the first bicycle bag to the hook element 45 of the second bicycle bag. Since all hook elements are without locking bolts, the two bicycle bags are additionally provided with a separate lock 48 of a conventional configuration.

When joining two hook elements, first one hook element is inserted with the second hook shank 3 approximately horizontally from the front to the rear into the slot 4 of the other hook element. Because of the slanted contact surfaces 7 and 6, initially a great play results upon joining so that overall the joining action is simplified in comparison to the known hook elements, which had to be very precisely positioned relative to one another and then carefully inserted into one another so that no canting would occur. In the hook elements according to the invention such a canting during joining is prevented. Moreover, it is also possible to join the hook elements according to the invention initially at an angle of 90°. For this purpose, the hook elements are joined such that the end face 14 of a first hook element rests against the upperside 12 of the second hook element. Subsequently, the first hook element is rotated downwardly by 90° wherein this rotation is facilitated by the rounded portions 16 and 18. After completion of the 90° rotation, the upper side 12 of one hook element rests against the slanted edge 13 of the other hook element, respectively. In this way, the two hook elements are joined flush with one another. This flush joining results also for a normal horizontal insertion of one hook element into the other hook element.

With the hook element according to the invention it is no longer required that for the manufacture of, for example, bicycle bags, the hook elements must be arranged always at the same location. It is possible to provide greater tolerances which allow a simpler manufacture of the bicycle bags. Overall, the joining of the hook elements and thus of the bicycle bags is significantly simplified by the invention.

What is claimed is:

1. A hook element for detachably connecting two objects with one another, the hook element comprising:
   a first hook shank (2) having an upper end;
   a second hook shank (3) having an upper end provided with an upper edge (17);
   a hook bow (1) connecting the upper ends of the first and second hook shanks (2, 3), wherein the hook bow (1) has a lateral cutout (5), wherein the lateral cutout (5) is limited by the upper edge (17) of the second hook shank (3);
   at least one of the first and second hook shanks (2, 3) having a slanted contact surface (6);
   wherein one of the first and second hook shanks (2) has a receiving opening (35) for receiving a hook shank (3) of a second hook element;
   wherein the receiving opening (35) has an upper side (36) and an underside (37) and wherein, in an insertion direction of the hook shank (3) of the second hook element, the upper side (36) and the underside (37) are slanted so as to converse conically in the insertion direction.

2. The hook element according to claim 1, wherein the slanted contact surface (6) extends along a forward edge (8) of the at least one of the first and second hook shanks (2) over an entire length of the at least one of the first and second hook shanks (2, 3).

3. The hook element according to claim 1, wherein the first hook shank (2) and the second hook shank (3) each have one of the slanted contact surfaces (6, 7).

4. The hook element according to claim 1, wherein the hook bow (1) has a lower edge (14) and wherein the lower edge has a rounded portion (15).

5. The hook element according to claim 1, wherein the upper edge (17) has a rounded portion (18).

6. The hook element according to claim 1, wherein one of the first and second hook shanks (2) has two oppositely positioned grooves (38, 39) for attachment of the hook element on a container.

7. The hook element according to claim 1, wherein the first hook shank (2) and the second hook shank (3) each have one of the slanted contact surface (6, 7), wherein the slanted contact surface (7) on the second hook shank (3) extends from an outer side (19) of the second hook shank (3) to an inner side (25) of the second hook shank (3).

8. The hook element according to claim 1, wherein the slanted contact surface (6) is provided on the first hook shank (2) and wherein, beginning at a forward edge (8) of the first hook shank (2), the slanted contact surface (6) extends to the inner side (10) and to the outer side (9) of the first hook shank (2).

9. The hook element according to claim 8, wherein the forward edge (8) of the first hook shank (2) is rounded.

10. The hook element according to claim 1, further comprising a locking bolt (27) having a bolt head (28), wherein the first hook shank (2) has a shank portion (30), positioned below and laterally relative to the hook bow (1), wherein the shank portion (30) has an opening (31) for receiving a bolt head (28) of a locking bolt (27) of a second hook element.

11. The hook element according to claim 10, wherein the first hook shank (2) has a cutout (32) for receiving the locking bolt (27).

12. The hook element according to claim 10, wherein the second hook shank (3) has an inner side (25) and wherein the inner side (25) has a slanted portion (33) arranged approximately opposite the opening (31) of the first hook shank (2) and extending from the innerside (25) to the upper edge (17) of the second hook shank (3).

13. The hook element according to claim 10, wherein the bolt head (28) of the locking bolt (27) is approximately slanted in a pyramid shape.

* * * * *